United States Patent [19]
Evans

[11] 3,732,782
[45] May 15, 1973

[54] VARIABLE GAIN AMPLIFIER FOR HYDRAULIC SERVO-CONTROL SYSTEMS

[75] Inventor: Wendell I. Evans, Cincinnati, Ohio

[73] Assignee: Cincinnati Milacron Inc., Cincinnati, Ohio

[22] Filed: Mar. 15, 1971

[21] Appl. No.: 124,165

[52] U.S. Cl. ............................91/6, 91/37, 60/97 T, 60/51
[51] Int. Cl. ...............F01b 25/02, F15b 21/02, F15c
[58] Field of Search......................91/36, 37, 38, 436, 91/6, 9, 28; 60/97 T, 54.5, 51

[56] References Cited

UNITED STATES PATENTS

| 3,375,658 | 4/1968 | Slover | 91/6 |
| 3,353,451 | 11/1967 | Garrison et al. | 60/51 |
| 3,286,599 | 11/1966 | Evans | 91/36 |
| 3,194,535 | 7/1965 | Evans | 91/37 |
| 3,026,680 | 3/1962 | Evans | 91/37 |
| 3,081,060 | 3/1963 | Thomas | 91/36 |
| 3,237,406 | 3/1966 | Spannhake et al. | 60/51 |
| 3,038,449 | 6/1962 | Murphy, Jr. et al. | 91/6 |

FOREIGN PATENTS OR APPLICATIONS

| 941,041 | 3/1956 | Germany | 91/6 |
| 972,080 | 10/1964 | England | 91/6 |

Primary Examiner—Martin P. Schwadron
Assistant Examiner—A. M. Zupcic
Attorney—Howard T. Keiser & Jack J. Earl

[57] ABSTRACT

An hydraulic servo-control system has a variable gain amplifier which generates a control force large enough to overcome static forces resisting movement of a machine slide and minimize the effect of forces which cause compression of the hydraulic fluid. The variable gain amplifier then operates at a lower gain level once the slide is in a kinematic state.

1 Claim, 9 Drawing Figures

SHEET 1 OF 2
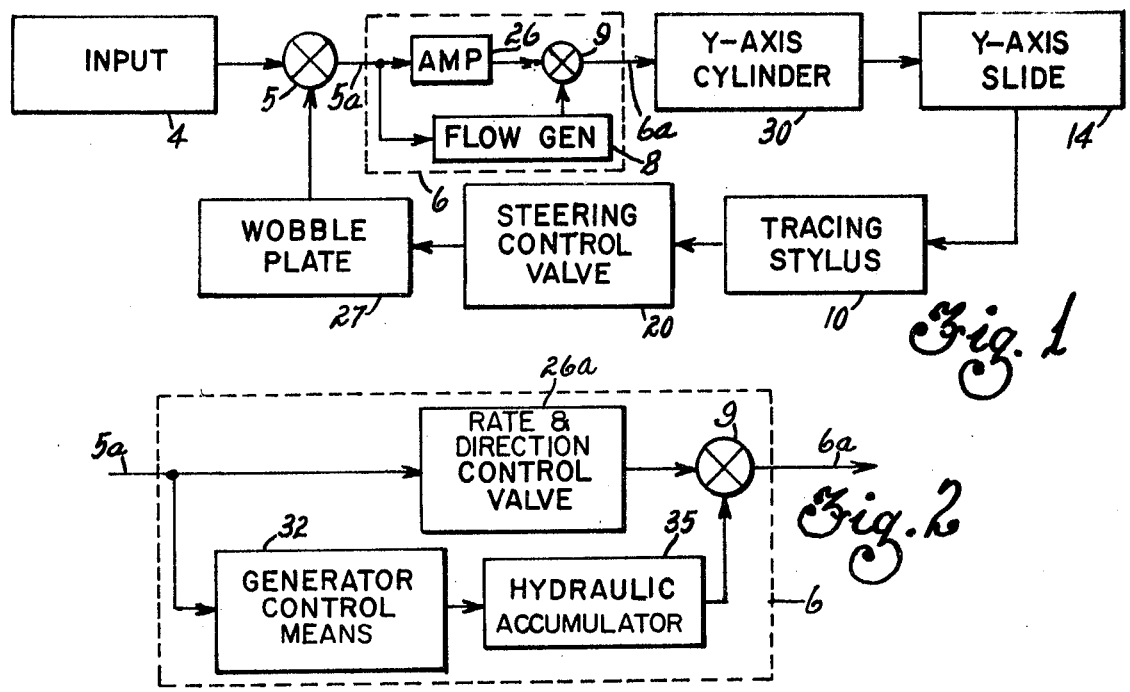
Fig. 1
Fig. 2
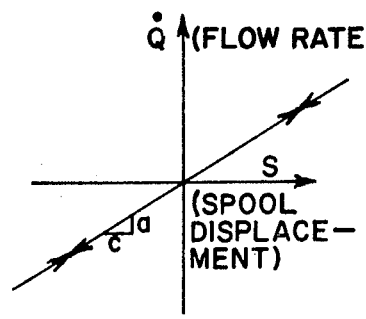
Fig. 3
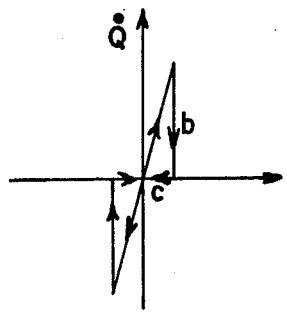
Fig. 4
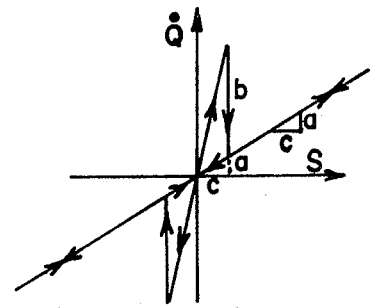
Fig. 5
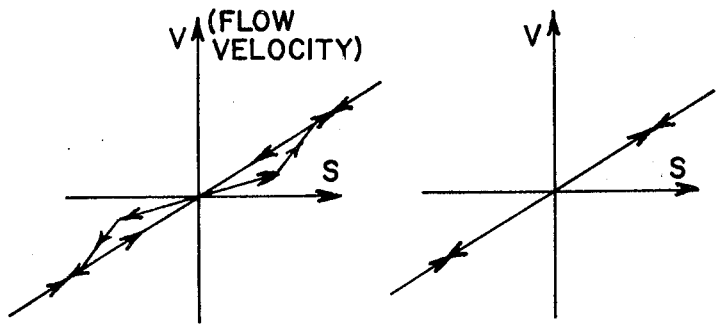
Fig. 6
Fig. 7
INVENTOR.
WENDELL I EVANS
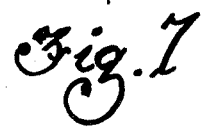
BY
ATTORNEYS

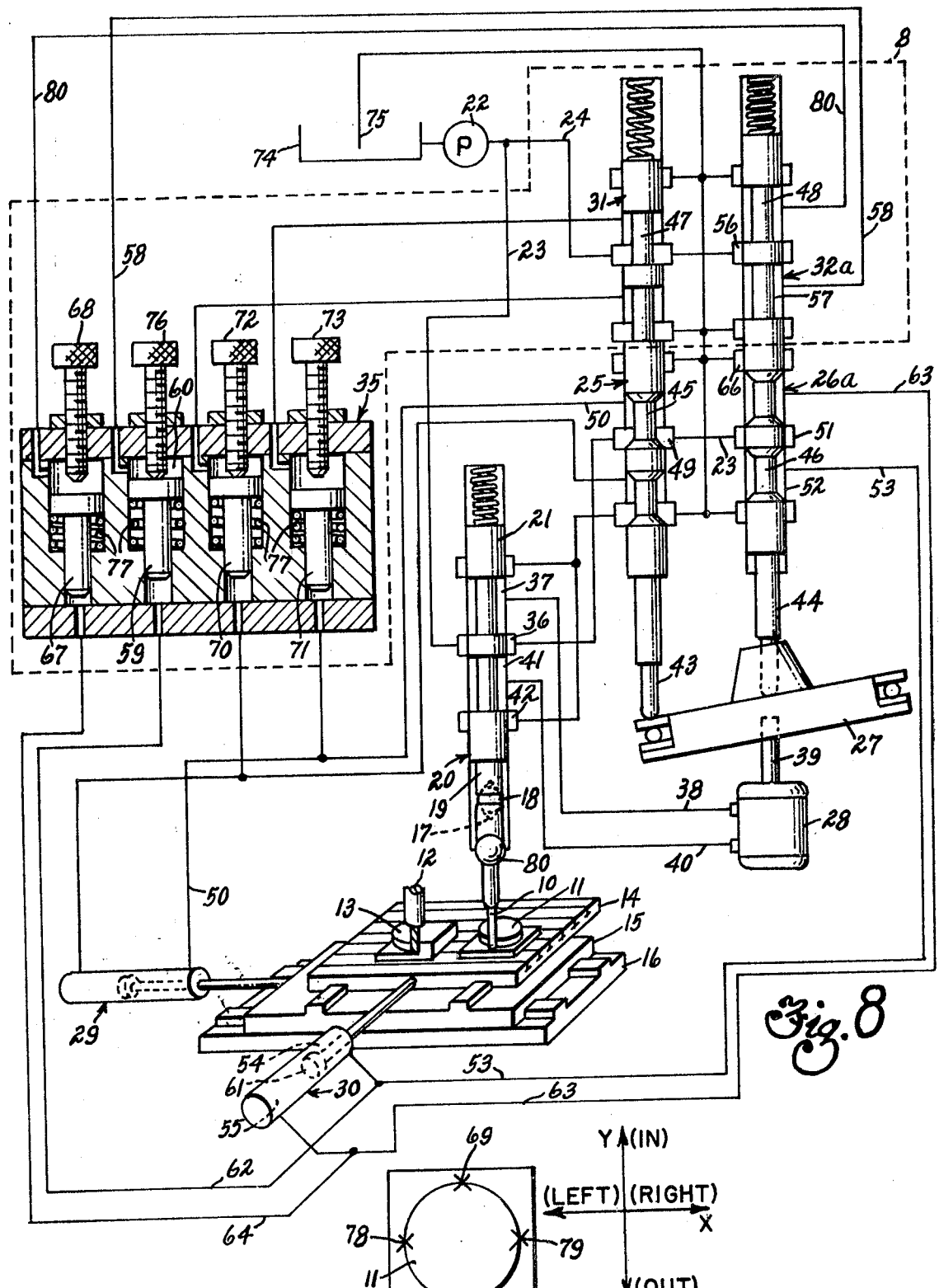

3,732,782

VARIABLE GAIN AMPLIFIER FOR HYDRAULIC SERVO-CONTROL SYSTEMS

BACKGROUND OF THE INVENTION

This invention relates to a servo-control system for machine tools and more particularly to a control system for profile tracing mechanisms. In hydraulic servo-control systems for machine tools, slide movements are often controlled by a piston and cylinder arrangement. The accuracy of slide movement when initiated by a control valve is dependent upon (1) dead band of the servo-control system, reflected in the control valve; (2) friction forces resisting slide movement; and (3) viscous friction causing compression of hydraulic fluid within the servo network because of the inherent nature of fluids to resist flow.

In the past there has always been a short time delay before movement of a slide at rest would begin. With the advent of larger machines having greater slide travel this delay increases because of the increased volume of hydraulic fluid. This fluid becomes compressed in the servo-network during slide movement. The friction forces resisting movement of a components load, comprising for example a workpiece and machine slides, also increase with machine size. Although these factors are relative to machine size, the required accuracy of parts produced is at least equal and often more precise than in earlier operations. Thus these factors become critical in the functioning of hydraulic servo-control systems in machine tools.

These factors are particularly harmful in systems where more than one slide in the machine tool may be in motion at any one instant. For example, while profile tracing around a template, one slide may continue in a fixed direction and another may instantaneously stop and reverse direction due to a change in template contour. However, before reversal of slide movement is initiated, the compressed fluid in the supply side of the servo network must reach an equilibrium pressure comparing to the exhaust pressure of the network. Therefore, fluid must be subtracted from one side of the system and added to the other before movement begins. The friction forces preventing slide movement also have to be overcome, and the dead band of the system as reflected in the control valve has to be passed. All of these factors are eliminated while the other slide continues in motion, creating a flat surface in the direction of the moving slide to be machined on the workpiece. This objectionable flat surface is known as a cross-over mark.

The present invention comprises a flow generation system which works in unison with the amplifier of a hydraulic servo-system to create a variable gain amplifier. This amplifier generates a force on the machine tool slide in the direction of motion at the instant the movement is to be initiated by the control valve.

The flow generation system produces a force in the direction of slide movement which is large enough to overcome friction forces resisting slide movement, and which reverses the pressure difference in the supply and exhaust sides of the servo-network. The force further initiates movement without respect to the dead band of the servo-system. Once the critical factors preventing initial movement have been overcome, the flow generation system drops out of the servo-network and the network continues to function as in the past during the kinematic mode. Thus, through utilization of the present invention a variable gain amplifier is provided in the servo-system.

This amplifier provides an increased force starting the instant in time when static forces resist movement of the machine tool slide. The amplifier further provides a means for minimizing the difference in pressure in the exhaust and supply loops of the servo-network. The output of the variable gain amplifier is then reduced to a lower level as the machine tool slide continues in one direction. Thus, instantaneous directional change in slide movement is made possible by the use of the present invention. This minimizes the cross-over mark which results, particularly in profile tracing around a template, when one slide continues in motion while a second slide reverses direction.

It is, therefore, an object of the present invention to provide an hydraulic servo-system with a variable gain amplifier. For generating a force large enough to overcome static factors inhibiting slide movement. The amplifier gain then decreases to a reduced magnitude once the system has entered the kinematic state.

Another object of this invention is to minimize the compressibility factor of the hydraulic fluid when direction change is initiated by the control valve.

It is further an object to decrease the effect of the dead band of the servo-system as reflected in the control valve, and the effect of friction forces preventing slide movement in a hydraulic servo-system.

Other objects and features of the invention will be apparent in the accompanying drawings and description.

THE DRAWINGS

FIG. 1 is a signal flow chart for one axis of a hydraulic feed back control system with a variable gain amplifier.

FIG. 2 is a flow chart of the variable gain amplifier of the present invention.

FIG. 3 is a flow gain curve of a typical servo valve.

FIG. 4 is a flow gain curve of the flow generation system.

FIG. 5 is a flow gain curve of the variable gain amplifier of the present invention.

FIG. 6 is a curve showing system response of prior art systems.

FIG. 7 is a curve showing system response utilizing the present invention.

FIG. 8 is a schematic diagram of a hydraulic tracing circuit using the present invention in its preferred form.

FIG. 9 is a diagrammatic representation of the tracing finger and profile template in the position illustrated in FIG. 8.

DESCRIPTION

The feedback system shown in FIG. 1 is a simplified servo-system for the Y-axis of a 360 degree tracing mechanism. The input 4 is a manual input by the operator who manually places the tracing mechanism on the template. An amplifier 6 then amplifies this signal which serves as an input to the Y-axis cylinder 30. The Y-axis cylinder 30 then produces an output which moves the Y-axis slide into position. The actual position is then picked up by the tracing finger 10. The output of the tracing finger 10 directs a steering control valve 20 which rotates a wobble plate 27 if the position is incorrect or a new position is desired due to change in template contour. This signal is then compared with the input signal at the summing junction 5 and the difference is fed into amplifier 6. It should be noted that the tracing finger 10, the steering valve 20 and the wobble plate 27 form a feed back loop which could be replaced by any suitable position detection means.

FIGS. 3 through 5 show the output of the variable gain amplifier 6 and its components—a constant gain amplifier, rate and direction control valve 26 and flow generator 8. The flow generator 8 herein comprises the hydraulic accumulator 35 and the generator control valve 32, as shown in FIG. 2. The Q-axis represents amount of fluid flow through the valve. The S-axis represents displacement from null of the spool of control valve 26. The intersection of the Q and S axes represent null. Gain is defined as the slope of the plot, for example, a/c is the gain of the control valve as illustrated in FIG. 3. The arrows on the plot indicate the path followed from and to null position. As can be seen, particularly in FIG. 5, these paths often overlap.

FIG. 6 illustrates response of prior art systems. FIG. 7 depicts system response utilizing the present invention. V is the velocity of slide 14, and S is the displacement from null of the spool of control valve 26. The arrows indicate the path to be followed when the spool is either approaching or moving from null position. Again, these two paths overlap in certain regions.

In the past, the amplifier 6 consisted only of control valve 26. As illustrated in FIG. 3 the flow of fluid through valve 26 increased linearly with displacement of the spool of valve 26. The gain of the amplifier is constant, being defined as the slope a/c. As the spool moves from null in either direction the velocity of slide 14 is dependent upon the amount of fluid flowing through the open port. If there are no other factors present, slide 14 will respond instantaneously as shown in FIG. 7. However, forces which inhibit initial slide movement from a position at rest cause the slide to lag behind the velocity commanded by the spool position causing the condition shown in FIG. 6.

These forces inhibit slide movement in the cross-over region, where the spool of valve 26 crosses from one side of null to the other indicating a change in direction of the slide 14. If the slide 14 is to respond accurately to eliminate crossover mark, the slide 14 must change directions instantaneously upon command from the control valve 26, and these detrimental factors must be minimized.

The amplifier 6 is the variable gain amplifier of the present invention. It consists of two parallel components, the constant gain amplifier 26, herein the rate and direction control valve 26a, and the flow generator 8. The flow generator 8 herein comprises the generator control means 32 and the hydraulic accumulator 35, as shown in FIG. 2. The output of these components are added at summing junction 9. The flow generator 8 has flow characteristics shown in FIG. 4. It is a constant gain (slope = b/c) amplifier which operates only in a limited region, and when the valve spool, see FIG. 3, is typically moving away from null. As can be seen in FIG. 4, the flow generator 8 has a zero gain when the valve spool (see FIG. 3) is progressing toward null. Thus when a signal 5a is generated and is within this limited region both the control valve 26 and the flow generator 8 begin to respond. However, since the flow generator 8 has a very short on time, it is only responsive in the region where forces resist instantaneous movement of the Y-axis slide. The output of the flow generator 8 is summed with the output of the control valve 26a at summing network 9 to produce signal 6a which is the input to the Y-axis cylinder 30. The signal 6a, which is the output of the amplifier 6, is illustrated in FIG. 5.

It can be seen in the region where adverse factors would resist movement, the output of flow generator 8 would be added to the output of control valve 26a giving the system an increased flow. As the spool moves from null the output 6a of amplifier 6 is the summed output of the control valve 26a and the flow generator 8. As illustrated in FIG. 5 the gain of amplifier 6 in this region is $(a+b/c)$ or the sum of the gains of control valve 26 and flow generator 8. As the slide 14 passes the crossover region, the increased gain is no longer necessary. The amplifier 6 then becomes essentially control valve 26a having a gain equal to a/c. This added flow caused by flow generator 8 will generate greater force on slide 14 thus reducing the effect of adverse forces inhibiting slide movement. This will permit the slide 14 to respond to a signal indicating direction change without lagging due to forces which become critical when the slide 14 is moved from rest. The output of the system utilizing the flow generator 8 to produce variable gain amplifier 6 approaches that illustrated in FIG. 7. Thus the cross-over mark caused by lagging movement of the slide 14 is greatly reduced.

FIG. 8 illustrates utilization of the variable gain amplifier 6 in a simplified 360 degree hydraulic tracing system. The tracing stylus 10 is engaged with template 11 and follows the contour of template 11 in guiding a cutting tool 12 around the workpiece 13 to produce a part identical to the template 11. Both the template 11 and the workpiece 13 are secured in the normal fashion to the worktable 14. The worktable 14 is slideably secured to a cross slide 15 which is in turn slideably secured to the machine base 16 to provide two axes of orthogonal movement. The tracing stylus is tiltable about the fulcrum point 80. There is an inverted conical seat 17 in the end of tracing stylus 10. Placed in seat 17 is a ball 18. The end of the control rod 19 of the steering valve 20 is a conical seat which bears directly upon the ball 18.

Ordinarily, the tracing stylus 10 is slightly off-set, with respect to the axis of rod 19 so that on slight deflection, causing shifting of the steering valve 20 and energization of the motor 28. The stylus 10 will move toward or away from the pattern in an arcuate path in a manner to compensate quickly for such deflection so that the rotary movement of shaft 39 is accurately controlled, as more particularly described in U.S. Pat. No. 2,682,202. This can be seen if the deflection angle is measured as the angle between the axis of the tracing stylus 10 and the plane of the table 14. As the angle approaches 90 degrees, the ball 18 will move downward in the seat 17. The ball 18 will move upward as the angle approaches zero. Thus whenever the deflection angle changes, due to a change in position of the tracing stylus 10 relative to template 11, the ball 18 will move up or down in the conical seat 17.

When the steering valve 20 is at null, the deflection angle of the tracing stylus 10 is less than 90 degrees. This deflection angle at null is called the normal deflection angle and is present when the tracing stylus and the template 11 are properly engaged with each other.

The pump 22 supplies fluid to the hydraulic system. Line 23 is the supply line to the main branch of the system. and line 24 is the supply line to the auxilliary portion of the system which includes the flow generation apparatus 8 of the present invention. Thus it can be seen only a single supply source 22 is needed for the entire tracing mechanism.

In a 360 degree tracing mechanism there must be a control valve for each axis. The rate and direction control of the X-axis is control valve 25 and for the Y-axis is the previously defined control valve 26a. The spool position of each control valve is determined by the circular wobble plate 27 which is rotated about its center by shaft 39 of hydraulic motor 28. The output of control valve 25 is supplied to slide cylinder 29 which provides the X-axis movement of the template 11 with respect to the tracing stylus 10. The output of the control valve 26a is supplied to slide cylinder 30 to provide Y-axis movement of the template 11 relative to the tracing finger 10.

In tandem with the control valves 25 and 26a are flow initiate valves 31 and 32a, respectively. These valves correspond to the control means 32 of the present invention. The outputs of valves 31 or 32a are supplied to the hydraulic accumulator 35 when either control valve 25 or 26a signals to initiate motion in the X- or Y-axis. The output of the hydraulic accumulator 35 is an auxiliary flow which is supplied to the slide cylinder 29 or 30. This flow assists the initial movement of machine tool slide 14 or 15 by generating a force large enough to minimize the difference in pressure between the exhaust and supply sides of the servo system and overcome the static friction forces resisting slide movement. The flow is instantaneously supplied, thus reducing the effect of dead band in the servo-system when motion is signaled to begin.

OPERATING MODE

To illustrate the operation of the preferred embodiment, it will be assumed that the position of the tracing finger 10 with respect to the template 11 is as shown in FIG. 9. Tracing stylus 10 is progressing counter-clockwise around the template 11. The X-axis motion (cross-slide 15) at this instant is maximum in the direction to the left. The Y-axis (table 14) is stationary. It can be seen from FIG. 9 that just prior to the position shown that table 14 is moving in. It further can be seen that the table 14 will begin to move out as soon as the tracing stylus moves passed the position illustrated. Thus, the table 14 must almost instantaneously change direction.

Tracing stylus 10 will tend to drift away from the template 11 at this point causing the deflection angle to approach 90 degrees. The ball 18 will fall further into the seat 17 and rod 19 will drop down. Now spool 21 will be displaced in steering valve 20 opening pressure port 36 into chamber 37. Hydraulic fluid will flow out through lines 38 and into hydraulic motor 28 causing counter-clockwise rotation of shaft 39. It can be seen that in this mode line 40 becomes the exhaust line of motor 28. Line 40 communicates with the exhaust line 75 through chamber 41 of steering valve 20. Exhaust line 75 drains to reservoir 74. As shaft 39 rotates the wobble plate will cause rods 43 and 44 to move up. Looking first at the X-axis control valve 25, the spool 45 is displaced, partially closing port 49. This reduces flow in line 50 which is the supply line to cross slide cylinder 29. The cross slide 15 motion will thus slow down but continue in the same direction.

The Y-axis control valve 26a is illustrated at null. It can be seen that the flow initiate valve 32a is also at null, at this time. As the wobble plate 27 rotates the spool 46 will displace, opening supply line to port 51 into chamber 52. Fluid flows out of chamber 52 through line 53 into the table cylinder 30, initiating movement of the table in an outward mode. It must be noted that just prior to the position of the tracing finger 10 and the template 11 as illustrated in FIGS. 8 and 9, the table was in motion in the opposite direction. During this period, fluid in chamber 55 and in the servo-system directly connected to chamber 55 became compressed due to forces restricting its flow. Now that movement of table 14 is to begin in the opposite direction (out), the difference in fluid pressure between chambers 54 and 55 must be eliminated before movement can begin. Further, the system must overcome static friction of the table 14 resisting movement from a position at rest.

Flow initiate valve 32a, which is mechanically linked in tandem with Y-axis control valve 26a is utilized to initiate a force which aids the servo-system in overcoming these adverse factors. This generates a force almost instantaneously and has a beneficial effect on the dead band of the control system as well. Before movement would normally begin, leakage and compression of fluid as well as static friction had to be overtaken by positive fluid flow. This gave the effect of a dead band on the spool 46 of controlling valve 26a, because it would move a certain amount before slide 15 followed.

It must further be noted that as pressure is building up in chamber 55 and cylinder 30, fluid is being moved from chamber 54 through line 53 and back to reservoir 74. Exhaust fluid also flows from line 62, which is in parallel with line 53, into hydraulic accumulator 35. This pushes plunger 59 up against stop 71 and reduces pressure in the exhaust side of the servo-network.

As Y-axis control spool 46 is displaced, spool 48, which is in tandem, must move in the same direction. Supply port 56 opens into chamber 57 permitting fluid flow through line 58 into hydraulic accumulator 35. The fluid flowing through line 58 enters chamber 60 forcing plunger 59 down, forcing fluid stored in the accumulator 35 back into the system through line 62.

The pressure of the output from hydraulic accumulator 35 is greater than the pressure input to the accumulator. For example, the cross-sectional area of the portion of plunger 59 which is present in chamber 60 may be twice that of the other end of plunger 59. Thus, one-half the pressure is needed to hydraulically balance the accumulator. Therefore, the added fluid flow which enters chambers 54 from the hydraulic accumulator via line 61 is at a higher pressure than the fluid in the rest of the system. This added pressure in chamber 54 is enough to equalize the force against piston 61 caused by the compressed fluid in chamber 55 and related servo-network, and static friction forces resisting movement of the table 14.

As the table 14 continues to move out fluid will become compressed in chamber 54 and the servo-network directly connected to chamber 54. Exhaust fluid will flow out chamber 55 through parallel lines 63 and 64. The fluid flowing through line 63 enters chamber 65 of control valve 26a and is emitted through port 66 to line 75 which drains into reservoir 74. The fluid in line 64 flows into accumulator 35 and forces plunger 67 up against stop 68. The spring 77 aids the fluid flowing into hydraulic accumulator from line 64 in pushing plunger 67 against stop 68.

It can be seen that when the tracing finger 10 reaches the position 69 as shown in FIG. 9, the table 14 direction will again reverse. Further, it can be seen that the plungers 70, 71 of hydraulic accumulator 35 act in the same manner as herein described to control the movement of the cross slide 15. The cross slide 15 would reverse directions at positions 78 and 79 as illustrated in FIG. 9.

The stops 68, 72, 73, and 76 are adjustable stops, such as set screws. This allows the amount of fluid stored in hydraulic accumulator 35 to correspond with the amount of force necessary to equalize the pressure difference and overcome the static friction for each movement of the machine tool slides. This force is dependent upon system components and may vary from machine to machine or from operation to operation. The adjustable stops 68, 72, 73 and 76 provide for adaptability of the variable gain amplifier 6 to any variations in physical apparatus which might change the amount of flow necessary to generate a large enough force to overcome the forces inhibiting the slide movement. That is, the amplifier 6 may be tuned to properly operate the particular physical system to which it is applied.

It should be understood that the embodiment of the invention as herein described is illustrative only and the invention includes alterations and modifications within the scope of the appended claims.

What is claimed is:

1. In a hydraulic servo control system, a variable gain amplifier responsive to a deflection signal generated by the deflection of a tracing stylus for producing a nonlinear fluid flow causing operation of a slide to move a workpiece and overcome the forces inhibiting movement of the slide from a position at rest, the variable gain amplifier comprising:
   a. a rate control valve producing a first fluid flow output linearly changing as a function of said deflection signal;
   b. a generator control valve in fluidic communication with said rate control valve for producing a control fluid flow in response to said deflection signal when the slide is to be moved from a position at rest;
   c. means for mechanically linking said servo control valve and generator control valve in tandem;
   d. an accumulator in fluidic communication with said control valve, said accumulator including;
      1. a fluid storage cylinder for accumulating fluid;
      2. means in association with said storage cylinder for generating fluid flow into said storage cylinder during the absence of said control fluid flow;
      3. a piston associated with said cylinder for forcing said accumulated fluid therefrom, thereby producing a second fluid flow output;
      4. means for connecting said piston and cylinder in fluid circuit with said generator control valve whereby said piston is actuated by said control fluid flow; and
      5. means associated with said fluid storage cylinder for varying the amount of fluid to be accumulated therein; and
   e. means in fluidic communication with said rate control valve and accumulator for adding the linearly changing flow of said rate control valve to the generator flow produced by operation of said piston for providing an output which is the sum thereof.

* * * * *